3,578,640
METHOD FOR THE PRODUCTION OF THERMALLY STABLE POLYCAPROLACTAM
Ian C. Twilley, Petersburg, Va., Guido John Coli, Jr., Madison, N.J., and David W. H. Roth, Jr., Chester, Va., assignors to Allied Chemical Corporation, New York, N.Y.
Filed Mar. 7, 1968, Ser. No. 711,328
Int. Cl. C08g 20/14
U.S. Cl. 260—78
9 Claims

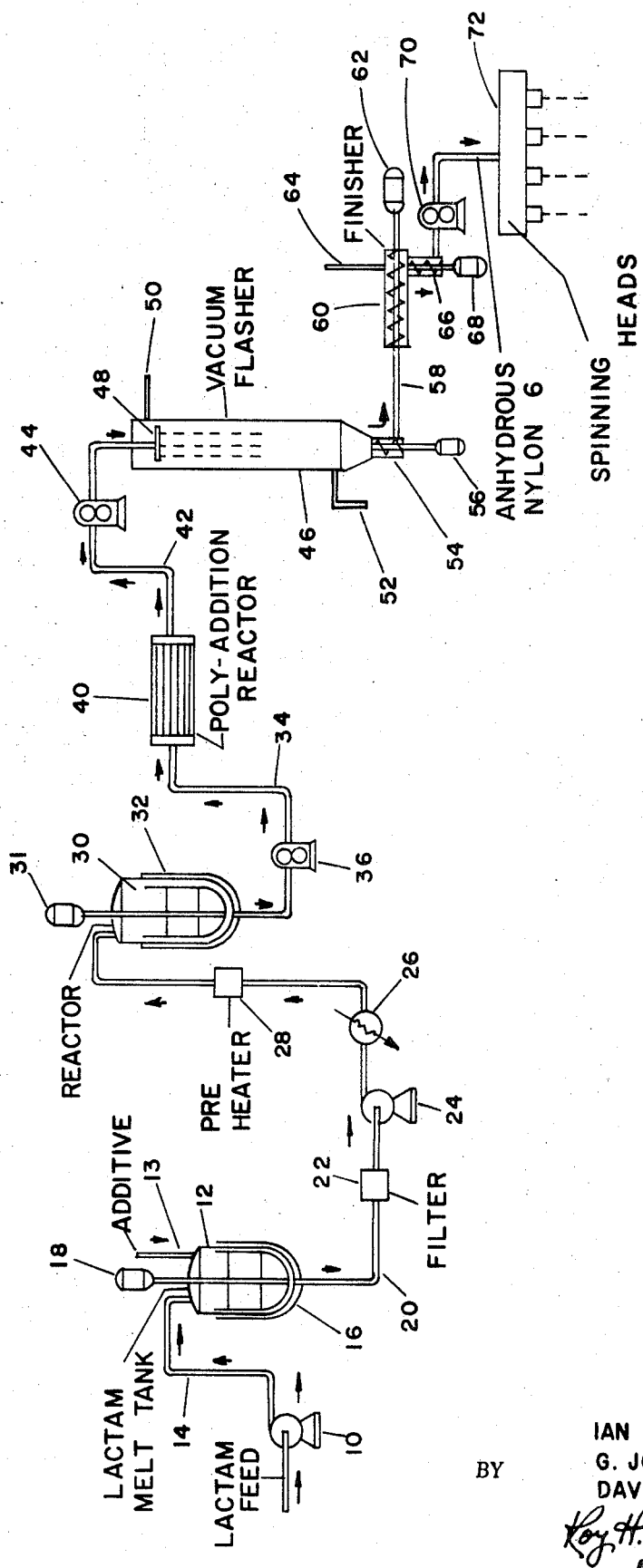

ABSTRACT OF THE DISCLOSURE

Shaped articles such as filaments are produced from polycaproamide in a continuous process which comprises extruding a nascent molten polymer having less than about 12 meq./kg. of minor species of unreacted end groups and less than 2.5 percent by weight water extractables following polymerization. The molten polymer is kept substantially anhydrous and maintained under shear in a filled system until extruded to form a product. This process effectively inhibits the regeneration of monomer in the polymer and stabilizes the molecular weight thereof after polymerization thereby improving the quality of the products produced from the polymer melt prepared in accordance with the present invention.

BACKGROUND OF THE INVENTION

The present invention relates to a process for the production of polycaproamide filaments and more particularly to a continuous process wherein filaments are produced directly from a freshly prepared polymer of $\epsilon$-caprolactam, which has not been isolated in solidified form or exposed to a gaseous medium prior to its conversion into filaments.

Filaments of polycaproamide, otherwise known as nylon 6, find widespread use in view of their highly desirable physical, chemical and aesthetic properties. These filaments are usually prepared by the melt extrusion of molten nylon 6 polymer through spinnerette plates containing small-dimensioned orifices. The most generally employed method for the production of nylon 6 polymer involves the polymerization of $\epsilon$-caprolactam in the presence of water which serves to initiate the polymerization. However, polymers prepared in this manner are found to contain more than 10 percent water extractable material consisting of monomer and oligomers. The oligomers are mainly low molecular weight cyclic condensation products of $\epsilon$-caprolactam. The presence of such water extractable material has an adverse effect on the performance of the polymer in the extrusion manner of filaments or larger-dimensioned articles such as pipes. To produce fibers having satisfactory physical properties, the water extractable content, which consists of oligomers and $\epsilon$-caprolactam, should be less than 2.5 percent by weight of the polymer. The $\epsilon$-caprolactam content should be less than 0.5 percent thereof.

Various methods have been reported for attempting to remove water extractable materials from the nylon 6 polymer prior to its melt spinning. The most common approach involves the hot water leaching of the nylon 6 polymer in granular form to remove water extractable material, followed by thorough drying prior to melt extrusion. Another technique employed has been to subject the molten nylon 6, generally in the form of thin films or shallow layers, to an extremely high vacuum which removes the relatively volatile $\epsilon$-caprolactam monomer but has only a minor effect on the less volatile oligomer materials. Such purification techniques involve additional processing steps with attendant increased manufacturing cost. However, regardless of the purification technique applied to the nylon 6 polymer, once the reaction mass is no longer under the influence of vacuum, the monomer reforms within the polymer prior to spinning, said reformation being attributable to an equilibrium reaction.

The continuous processes have been best suited to sustained operations at constant throughput. In practice however, production requirements often necessitate polymer rate changes. These rate changes affect the polymer melt residence time which in turn affects the product quality, particularly the viscosity and end groups.

Variability of the polymer viscosity, which is a measure of the degree of polymerization, has a significant bearing on the spinning operation and tensile properties and quality of the fibers produced. In addition, the end groups have an effect on both the tensile properties and dyeability of the fibers produced. Therefore, when production requirements necessitate changes in the polymer throughput, problems arise in maintaining consistency in the fiber properties.

SUMMARY OF THE INVENTION

The principal object of the present invention is to provide a process for the production of nylon 6 polymer of low cyclic oligomer content and very low caprolactam content which will not regenerate caprolactam when held in the molten form. Another object is to provide a polymer having a constant relative viscosity and end group concentration when subjected to varying throughput rates. Another object of the present invention is to provide a process for the production of filaments of nylon 6 having low water extractable content. A further object of the present invention is to produce filaments from a nylon 6 polymer which has not been subjected to special purification steps subsequent to its production. A still further object of the present invention is to provide a process for the production of filaments from a nylon 6 polymer which has not existed in solidified form prior to the formation of said filaments. Other objects and advantages will become apparent hereinafter.

The objects of the present invention are accomplished in general by providing a process for the manufacture of polycaproamide shaped articles from a nascent polymer wherein $\epsilon$-caprolactam is polymerized at elevated temperature in the presence of water and a terminating agent to form a prepolymer, further polymerizing said prepolymer at a reduced pressure to form a substantially anhydrous molten polymer with a formic acid relative viscosity greater than 30 units having less than about 12 meq./kg. of minor species of unreacted end groups and having a water extractable content comprising oligomers and lactam of less than 2.5 percent by weight wherein the lactam represents less than 0.5 percent of the polymer, subjecting said molten polymer at a temperature between 250° C. and 300° C. in a closed system under shear to a hydraulic pressure sufficient to extrude said polymer within an elapsed time of less than 2 hours since formation of said molten polymer, and cooling the extruded polymer in the form of continuous shaped articles of uniform cross-sectional configuration. By nascent polymer is meant a molten polymer which has not been isolated such as by solidification subsequent to polymerization.

In general, water in the amount of between 0.2 percent and about 1.5 percent by weight of the ε-caprolactam monomer is employed to initiate the polymerization reaction. The initial polymerization reaction mixture of monomer and water also contains a chain terminator in the amount of between about 0.1 mole and about 0.7 mole per 100 moles of ε-caprolactam. The mixture is heated, generally at elevated pressure to a temperature in the range of 225° C. and about 280° C. to produce a prepolymer composition containing between 8 percent and 30 percent unreacted monomer. In a preferred embodiment of the present invention, the production of the prepolymer is carried out in the manner described by U.S. patent application S.N. 694,044 of Twilley et al. filed Dec. 28, 1967. As disclosed therein, the initial polymerization mixture is heated under conditions such that less than about 45 percent of ε-caprolactam is reacted at the end of about one hour and the mixture goes through a maximum end group concentration to form a composition containing hydrolysate. The hydrolysate is then heated at elevated pressure in the presence of water to obtain a prepolymer composition. The steps leading to the production of prepolymer may be carried out in stirred kettles or analogous processing equipment to handle materials of moderate viscosity. All operations are in general carried out in the absence of oxygen.

To accomplish further polymerization of the prepolymer under reduced pressure to form a substantially anhydrous molten polymer, apparatus is employed capable of handling highly viscous materials, and preferably, apparatus equipped with means for agitation whereby the molten material is formed into relatively thin layers or films to facilitate removal of volatile materials from the polymer. The temperature of the final polymerization stage is in the range of 250 to 300° C. and is carried out for a period of time between 30 minutes and 2 hours. A vacuum of 10 mm. to 0.1 mm. Hg is applied to the polymer during its formation in the second stage.

The present invention is based in part on the discovery that nylon 6 polymer, when anhydrous and having less than about 12 meq./kg. of minor species of unreacted end groups, is resistant toward regeneration of monomer under molten conditions and will maintain a constant viscosity and end group concentration so that it can be forwarded directly to a spinning machine and converted into high-quality synthetic filaments. The process is carried out in a completely filled system wherein the polymer is not contacted with a gas following polymerization and stagnant zones are prevented by keeping the polymer under a shear rate of at least 1.0 reciprocal seconds until formed into filaments.

In an ordinary nylon 6 polymer made from pure ε-caprolactam, each molecule will ideally have a primary amino group at one end of the polymer chain and a carboxyl group at the other end. Quantitative measurement of said end groups may be carried out by chemical titration. The terminating agents employed in the process of this invention are compounds which react with either a primary amino group or a carboxyl group. Addition of such terminating agent to otherwise pure ε-caprolactam changes the balance or stoichiometry of reactive groups, and leads to nylon 6 polymers having an end group distribution different than in the idealized case for polymers derived from pure ε-caprolactam. For example, if a small amount of acetic acid is added to the ε-caprolactam prior to polymerization, the resultant polymer will be found to contain acetyl end groups at the expense of amino end groups. Likewise, if a small amount of decylamine is added to the ε-caprolactam prior to polymerization, the resultant polymer will have N-decyl amide end groups at the expense of an equal number of carboxyl groups.

The "unreacted" end groups mentioned hereinabove refer to either amino or carboxyl groups, since these are the end groups which are depleted by reaction with the terminator agent, as determined by chemical titration. The minor species of unreacted end groups is thus either the amino or carboxyl groups, depending upon which gives a lower value upon titration analysis.

Terminating agents useful in the practice of this invention are preferably non-volatile compounds, and may be monofunctional or polyfunctional with respect to reactivity with either amino or carboxyl groups. Typical carboxyl-reactive species include amines such as metaxylylenediamine, benzylamine, 4,4' diaminomethyldiphenyl, beta - aminomethylnaphthalene, aminopropylmorpholine, 1,5-diaminomethylnaphthalene, and the like.

Suitable amine-reactive terminators may be selected from those described in U.S. Pat. No. 3,369,057 of I. C. Twilley. The polyamides of said patent are found especially suited for melt blending with polyesters to produce a new type of polyblend material of eminent value in the production of fibers. A preferred class of amine reactive terminators are the difunctional compounds having at least six carbon atoms as described in U.S. Pat. 3,386,967 of I. C. Twilley.

Typical amine-reactive terminators include, for example, aliphatic dicarboxylic acids such as adipic acid, hexa-3-enedioic acid, pimelic acid, suberic acid, azelaic acid, sebacic acid, undecanedioic acid, dodecanedioic acid and tetradecanedioic acid; alicyclic dicarboxylic acids such as cyclohexane-1,4-dicarboxylic acid, cyclohexa-2,5-diene-1,4-dicarboxylic acid, Decalin-2,6-dicarboxylic acid and bicyclohexyl-4,4'-dicarboxylic acid; aromatic dicarboxylic acids such as terephthalic acid and naphthalene-1,5-dicarboxylic acid; heterochain dicarboxylic acids such as ethylene glycol-bis-carboxymethyl ether; and aliphatic monocarboxylic acids such as acetic acid, proprionic acid and stearic acid.

The chain terminators can also contain substituent groups, provided such groups do not react with the amino or carboxyl groups in the course of the polymerization reaction or hinder the reactivity of the terminator with the amino or carboxyl groups of the polyamide. Examples of such substituents include lower alkyl groups, ether groups, tertiary amine groups, sulfane groups, and the like. Also, the terminators must be thermally stable and relatively non-volatile under polymerization conditions. Similarly amine-reactive derivatives of carboxylic acids, e.g., monoesters, diesters, dibasic acid anhydrides, and the like, are also suitable for reacting with amino end-groups in the process of the present invention.

Terminating agents suitable for use in the present invention are used in amounts of between about 0.1 and about 0.7 mole per 100 moles of ε-caprolactam and preferably between about 0.15 and about 0.30 mole per 100 moles of ε-caprolactam. The amount of terminator employed determines to a large extent the molecular weight of the polyamide and the proportion of end-groups. Thus, the use of about 0.45 mole of dicarboxylic acid per 100 moles of ε-caprolactam generally results in a polyamide having an average molecular weight of about 15,000 and containing about 20 milliequivalents of amino end-groups per kilogram of polymer (abbreviated hereinafter as meq./kg.). The use of a dicarboxylic acid within the preferred range of between about 0.30 mole and about 0.15 mole per 100 moles of ε-caprolactam will afford a polyamide having an average molecular weight between about 25,000 and about 40,000, which corresponds to a formic acid relative viscosity of about 60 to 200 units. Such a polyamide will contain less than about 12 meq./kg. of primary amino groups, which is satisfactory for melt-blending operations with polyesters.

In addition to chain-terminating agents, other property-modifying ingredients may be added to the reaction mixture in any desired amount. Examples of such additives include fire-retarding agents (e.g., antimony, phosphorus, and halogen compounds), delustrants (e.g., titanium dioxide), antistatic agents, adhesion promoting agents (e.g., isocyanates, and epoxides), heat and light stabilizers (e.g., inorganic reducing ions); transition metal ions (e.g., $Mn^{+2}$, $Cu^{+2}$, $Sn^{+2}$); phosphites, organic amines (e.g., alkylated aromatic amines and ketone-aromatic amine condensates), thermally stable pigments, fluorescing agents and brighteners, latent crosslinking agents, bacteriostats (e.g., phenols and quaternary amines); colloidal reinforcing particles, anti-soiling agents, and the like. These additives can be incorporated into the polymer at any stage of the reaction, whether as concentrates distributed in the monomer or in preformed polyamide, or as pure ingredients. From the standpoint of operational efficiency, however, the additives are preferably introduced together with chain-terminating agent at the commencement of the process. Proper dispersion of these ingredients within the polymer are achieved by means conventional in the melt-spinning art.

Carboxyl groups in the polymer are analyzed by dissolving a polymer sample in benzyl alcohol and titrating with sodium hydroxide solution in benzyl alcohol, to the phenolphthalein end point. Primary amino groups are analyzed by dissolving a polymer sample in o-cresol and titrating with p-toluenesulfonic acid solution in methanol, to the thymol blue end point.

The formic acid relative viscosity mentioned hereinabove is based on the standard analytical method, ASTM–D–789–62T, and is carried out on a sample of washed and dried polymer.

The total water extractables content of nylon 6 which is composed of monomer and oligomers, is determined by measuring the differential refractive index of the aqueous solution obtained after heating the polymer in water under reflux for 2 hours in accordance with the procedures outlined by Ongemach et al in Anal. Chem., vol. 38, pp. 123–25, January 1966. The monomer content of nylon 6 is determined on the same aqueous solution using gas chromatographic procedures as outlined by Ongemach and Moody, Anal. Chem., vol. 39, p. 1005, July 1967. The oligomers content of nylon 6 is the difference between the total water extractables content and the monomer content.

BRIEF DESCRIPTION OF THE DRAWING

A single figure illustrates schematically one arrangement of apparatus preferred for use in carrying out the process of the invention.

Referring to the drawing, molten lactam feed pump 10 is shown connected to a lactam melt tank 12 by a supply line 14. The temperature required to keep the lactam within the holding tank 12 in a liquid state is maintained by any suitable conventional heating means. For example, an insulating jacket 16 can be used to provide external heating by conventional methods such as electric heaters or heat transfer media. Temperature gradients within the lactam tank 12 are minimized by employing a suitable agitation means such as a conventional motor driven stirrer 18. Additives such as chain terminators are introduced into tank 12 through line 13 from a source, not shown.

The lactam in tank 12 is transferred via line 20 successively through filter 22, pump 24, flowmeter 26 and preheater 28 into reactor 30. The reactor 30 can be heated by any suitable means such as described for heating tank 12.

Filter 22 may be filled with any suitable filtration medium. More than one filter may be employed if desired. Similarly, one or more flow meters of a well known type may be employed in combination with any type pump capable of obtaining a proper flow rate.

The reaction mixture flowing into hydrolyser 30 can be agitated as the melt passes through the vessel by rotation of the conventional stirrer 32, driven by motor 31. Pressures within reactor vessel 30 which are usually greater than atomspheric, are obtained by conventional methods, such as autogenous or by using live steam to to generate the desired pressure.

From reactor 30, the reaction mixture consisting of low molecular weight polyamide, additives, unreacted lactam, and water is pumped through line 34 by metering pump 36 to a poly-addition reactor 40 which preferably comprises a shell and tube-type heat exchanger with reaction mixture on the tube side and heating fluid on the shell side. Suitable heating fluids include heat transfer media such as, for example, Dowtherm C, an isometric terphenyl mixture of M.P. 150° C.; B.P. 340–390° C.

The reaction product from poly-addition reactor 40 is a prepolymer consisting essentially of polyamide, oligomers (less than 2 percent), additives, water and lactam. This material is transferred through line 42 by metering pump 44 to a vacuum flasher 46. The material enters the vacuum flasher 46 through a foraminous or multi-hole die plate 48. The pressure within the vacuum flasher is controlled by means of a vacuum source, not shown, connected to line 50. By suitable adjustment of bleed line 52, the vacuum within flasher 46 can be maintained at a level sufficient to remove most of the water and part of the unreacted lactam from the reaction products which pass through die plate 48 into flasher 46 in the form of rather fine strands having a large surface area-to-volume ratio. Bleed line 52 is adapted to admit any desired gas into vacuum flasher 46 at a controlled rate. Preferably, a chemically inert gas such as nitrogen is utilized for bleeding purposes to prevent oxidation of the hot polymer melt within the flasher 46.

Vaporizable material is removed from vacuum flasher 46 through line 50 and condensed in a conventional manner. Unreacted caprolactam can be separated from the recovered material by means well known to the art and recycled back to the reactor 30.

The reaction mixture, which now consists of polyamide polymer, additives, oligomers and lactam, is dropped into an extruder pump 54 which serves the dual purpose of raising the temperature of the reaction mixture and maintaining flow conditions. Heating within the extruder is required to regain the heat loss occurring through the temperature drop in the vacuum flasher 46. Heat is added to the reaction mixture in extruder 54 as a result of the mechanical work done on the flow stream.

Material emerging from the extruder which is operated by motor 56 is transferred continuously to a finisher 60 through line 58. Finisher 60 is a surface renewal device which promotes completion of the polymerization reaction, and removes residual amounts of vaporizable materials. For example, finisher 60 can be of the screw-type extrusion variety driven by a motor 62. Vacuum may be applied to the interior of the finisher by means of a vacuum source, not shown, connected to line 64.

Anhydrous nylon 6 containing less than 2.5 percent water extractables which has not been solidified or stored in a stagnant zone since polymerization is withdrawn from the finisher by way of exit 66 which is comprised of an extrusion type pump powered by motor 68. A metering pump 70 feeds the anhydrous nylon 6 under hydraulic pressure directly to a plurality of spinning heads 72.

As will be noted from the foregoing description, in conjunction with the drawing, no isolation or further processing of the product nylon 6 emerging from the finisher is necessary prior to spinning. Thus, the present invention provides a highly efficient process for the production of filaments having improved properties.

PREFERRED EMBODIMENTS

The following examples are illustrative of several preferred embodiments of the process of the present invention:

Example I

To a melt tank was charged a mixture of 0.71 percent sebacic acid, 0.014 percent cupric acetate dihydrate, 0.7 percent water, and 98.5 percent epsilon-caprolactam. The molten mixture at a temperature of 90° C. was pumped continuously through a preheater, which heats the charge to the operating temperature, to a conventional, sealable, hydrolysis and polymerization apparatus (hereinafter called the reactor"). The reaction temperature was maintained at about 254° C., and the operating pressure was controlled at about 16 p.s.i.g. The flow rate to and from the reactor was adjusted so that the residence time within the reactor was about 1½ hours.

The material withdrawn from the reactor had the following analysis. Hot water extractables (i.e., monomer and oligomers) 52 percent, amino end groups 90 meq./kg., carboxyl end groups 166 meq./kg.

The molten hydrolysate was then pumped to a polyaddition reactor. The temperature of the hydrolysate within the polyaddition reactor was 290° C., pressure generated was essentially autogenous and the residence time of the reaction melt therein was about 1 hour. At the completion of this stage of the process, the prepolymer analyzed as follows: monomer content 12 percent, cyclic oligomer content 1.9 percent, amino end groups 42 meq./kg., carboxyl end groups 115 meq./kg. The above prepolymer was pumped to a flasher through a die plate where the pressure was reduced to 50 mm. Hg absolute pressure. In this reactor most of the free water and some monomer was removed. The residence time in this reactor was about 10 minutes.

From the flasher, the polymer melt was continuously transferred to a single screw horizontal reactor called a finisher operating at a temperature of about 280° C. under a vacuum of about 4 mm. Hg abs. pressure. The material remained within the finisher for about 119 minutes, after which time the polymer was substantially anhydrous and had the following properties: FARV 55, cyclic oligomer content 1.8 percent, monomer content less than 0.1 percent, amino end groups 7 meq./kg., carboxyl end groups 83 meq./kg.

From the finisher the polymer melt was fed under hydraulic pressure via a transfer line at 280° C. directly to a spinning block where the product was extruded into filaments. The residence time in the transfer line was about 59 minutes. The fiber so formed had the following properties: FARV 55 cyclic oligomer content 1.8 percent, monomer content less than 0.1 percent, amino end groups 7 meq./kg., carboxyl end groups 83 meq./kg.

Examples II–XII

In the following Examples II–XII the procedure of Example I was repeated except that the terminators, temperature, pressure, and residence time were varied to achieve the conditions prescribed in the invention. In Examples IX–XII, the conditions were such that the molten polymer had more than about 10 meq./kg. of minor species of unreacted end groups which resulted in an increase in the monomer content and viscosity of the final product.

To exemplify the deleterious effect of water content on the regeneration of monomer, some of the polymer prepared in Examples I, II and III was extruded and pelletized. Water was added to the chips produced so that the final water content of the polymer was 0.04 percent which is the equilibrium moisture content for the polymer and spinning temperature utilized. The chips were spun from a conventional spinning machine and the fiber so produced had the following properties: FARV 56, cyclic oligomer content 1.8 percent, monomer content 0.8 percent, amino end groups 7 meq./kg., carboxyl end groups 82 meq./kg.

| Example Number | Terminator type | Finisher processing conditions ||| Finisher product analysis |||||| Transfer line to spinning head conditions || Spinning head product analysis ||||||
|---|---|---|---|---|---|---|---|---|---|---|---|---|---|---|---|---|---|---|
| | | Temperature, °C. | Pressure mm. Hg | Residence time, minutes | F.A. R.V. | Percent extract ||| NH$_2$ | COOH | Temperature, °C. | Residence time, minutes | F.A. R.V. | Percent extract ||| NH$_2$ | COOH |
| | | | | | | Cyclic oligomer | Monomer | | | | | | | Cyclic oligomer | Monomer | | | |
| I | Sebacic acid | 275 | 4 | 119 | 55 | 1.8 | 0.1 | 7 | 83 | 280 | 59 | 55 | 1.8 | 0.1 | 7 | 82 |
| II | do | 276 | 4 | 120 | 55 | 1.7 | 0.1 | 7 | 83 | 281 | 79 | 55 | 1.7 | 0.1 | 7 | 83 |
| III | do | 276 | 4 | 119 | 55 | 1.7 | 0.1 | 7 | 83 | 281 | 118 | 56 | 1.7 | 0.1 | 7 | 81 |
| IV | Toluic acid | 280 | 5 | 62 | 51 | 2.0 | 0.2 | 10 | 57 | 281 | 61 | 52 | 2.0 | 0.2 | 9 | 57 |
| V | do | 285 | 5 | 75 | 52 | 2.2 | 0.2 | 5 | 3 | 285 | 100 | 52 | 2.2 | 0.2 | 5 | 3 |
| VI | M-xylylene diamine | 278 | 2–3 | 105 | 52 | 1.8 | 0.2 | 106 | 3 | 281 | 75 | 52 | 1.8 | 0.2 | 106 | 4 |
| VII | do | 278 | 2–3 | 100 | 52 | 1.5 | 0.1 | 106 | 3 | 280 | 115 | 53 | 1.5 | 0.1 | 106 | 3 |
| VIII | Benzylamine | 283 | 1 | 65 | 60 | 1.5 | 0.1 | 53 | 83 | 280 | 66 | 60 | 1.5 | 0.1 | 53 | 81 |
| IX | Sebacic acid | 285 | 5 | 58 | 54 | 2.5 | 0.1 | 14 | 88 | 283 | 25 | 58 | 2.5 | 0.7 | 11 | 80 |
| X | do | 285 | 5 | 52 | 54 | 2.4 | 0.7 | 14 | 88 | 283 | 61 | 59 | 2.4 | 1.3 | 11 | 14 |
| XI | M-xylylene diamine | 278 | 6 | 63 | 72 | 2.1 | 0.2 | 56 | 16 | 280 | 25 | 77 | 2.1 | 1.0 | 54 | 14 |
| XII | do | 278 | 6 | 61 | 72 | 2.1 | 0.2 | 56 | 16 | 280 | 55 | 78 | 2.1 | 1.5 | 53 | 13 |

We claim:
1. A process for the production of shaped articles from substantially anhydrous molten nascent polycaprolactam consisting of consecutively:
   (a) polymerizing ε-caprolactam at an elevated pressure and temperature of about 250° C. to about 280° C. in the presence of from about 0.2 to about 1.5% by weight of water and a terminating agent to form a prepolymer,
   (b) polymerizing the prepolymer under pressure of 0.1 to 10 mm. Hg. at a temperature of about 250° to about 300° C. for about one-half to about 2 hours to form a substantially anhydrous molten polymer having less than about 12 meq./kg. of minor species of unreacted end groups, less than 2.5 percent by weight water extractable material consisting of less than 0.5 percent monomer by weight of said polymer, and having a formic acid relative viscosity determined by ASTM D-789-62T greater than 30 units,
   (c) continuously maintaining molten polymer under a shear rate of at least one reciprocal second prior to extrusion,
   (d) extruding at a temperature between 250° C. and 300° C. the substantially anhydrous molten polymer through a spinneret within an elapsed time of less than 2 hours since formation of said polymer, and,
   (e) cooling said extruded polymer to form uniformly shaped articles.

2. The process of claim 1 in which the shaped articles are filaments.

3. The process of claim 1 in which the molten polymer is retained in a filled system subsequent to completion of polymerization until emerging from the spinneret.

4. The process of claim 1 wherein the prepolymer of step (a) contains about 8 to about 30% by weight of monomer.

5. The process of claim 1 wherein the molten polymer of step b contains between about 7 and about 12 meq./kg. of minor species of unreacted end groups, between about 1.7 and about 2.5% by weight of water extractable material and between about 0.1 and 0.5% by weight of monomer.

6. The process of claim 2 in which the terminating agent is selected from the group consisting of monoamines of at least 6 carbon atoms, diamines of at least 6 carbon atoms, and dicarboxylic acids of at least 6 carbon atoms.

7. The process of claim 2 wherein the terminating agent is selected from the group consisting of meta-xylylenediamine, benzylamine, 4,4'-diaminomethyldiphenyl, beta - aminomethylnaphthalene, aminopropylmorpholine, 1,5-diaminomethylnaphthalene, adipic acid, hexa-3-enedioic acid, pimelic acid, suberic acid, azelaic acid, sebacic acid, undecanedioic acid, dodecanedioic acid, tetradecanedioic acid, cyclohexane-1,4-dicarboxylic acid, cyclohexa-2,5-diene-1,4-dicarboxylic acid, Decalin-2,6-dicarboxylic acid and bicyclohexyl-4,4'-dicarboxylic acid, terephthalic acid, naphthalene-1,5-dicarboxylic acid; ethylene glycol-bis-carboxymethyl ether, acetic acid, propionic acid and stearic acid.

8. The process of claim 6 in which the terminating agent is a dicarboxylic acid of at least 6 carbon atoms selected from the group consisting of aliphatic, alicyclic, aromatic and heterochain dicarboxylic acids.

9. The process of claim 8 in which the terminating agent is used in an amount between about 0.1 and about 0.7 mole per 100 moles of ε-caprolactam.

References Cited
UNITED STATES PATENTS

| | | | |
|---|---|---|---|
| 3,047,541 | 7/1962 | Ryffel et al. | 260—78 |
| 3,386,967 | 6/1968 | Twilley | 260—78 |

HAROLD D. ANDERSON, Primary Examiner

U.S. Cl. X.R.

260—78; 264—176